United States Patent
Yoshimoto et al.

(10) Patent No.: US 9,573,095 B2
(45) Date of Patent: Feb. 21, 2017

(54) FLUE GAS TREATMENT APPARATUS AND FLUE GAS TREATMENT METHOD

(71) Applicant: MITSUBISHI HITACHI POWER SYSTEMS, LTD., Yokohama-shi, Kanagawa (JP)

(72) Inventors: Takashi Yoshimoto, Tokyo (JP); Seiji Kagawa, Tokyo (JP); Toshihiro Fukuda, Tokyo (JP); Ryozo Sasaki, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 21 days.

(21) Appl. No.: 14/434,330

(22) PCT Filed: Nov. 28, 2013

(86) PCT No.: PCT/JP2013/082026
§ 371 (c)(1),
(2) Date: Apr. 8, 2015

(87) PCT Pub. No.: WO2014/103602
PCT Pub. Date: Jul. 3, 2014

(65) Prior Publication Data
US 2015/0265965 A1    Sep. 24, 2015

(30) Foreign Application Priority Data

Dec. 26, 2012  (JP) ................................ 2012-282971

(51) Int. Cl.
*B01D 53/10* (2006.01)
*B01D 53/50* (2006.01)
(Continued)

(52) U.S. Cl.
CPC .......... *B01D 53/508* (2013.01); *B01D 53/346* (2013.01); *B01D 53/50* (2013.01); *B01D 53/501* (2013.01);
(Continued)

(58) Field of Classification Search
CPC ..... B01D 53/10; B01D 53/1481; B01D 53/50; B01D 53/501; B01D 53/75; B01D 53/78; B01D 53/81
See application file for complete search history.

(56) References Cited

U.S. PATENT DOCUMENTS 4,590,049 A * 5/1986 Staudinger ........... B01D 53/501
110/343
7,776,141 B2 * 8/2010 Wu ....................... B01D 53/343
110/203
(Continued)

FOREIGN PATENT DOCUMENTS

| CN | 1105900 A | 8/1995 |
|---|---|---|
| EP | 0937491 A2 | 8/1999 |

(Continued)

OTHER PUBLICATIONS

Notification of Transmittal of Translation of the International Preliminary Report on Patentability (Form PCT/IB/338) issued in counterpart International Application No. PCT/JP2013/082026 mailed Jul. 9, 2015 with Forms PCT/IB/373 and PCT/ISA/237 (7 pages).

(Continued)

*Primary Examiner* — Timothy Vanoy
(74) *Attorney, Agent, or Firm* — Westerman, Hattori, Daniels & Adrian, LLP

(57) ABSTRACT

A flue gas treatment apparatus for removing sulfur contents contained in combustion flue gas, includes a treatment agent feeder to feed a treatment agent into a flue through which the (Continued)

combustion flue gas flows, a cooler to cool the combustion flue gas to which the treatment agent has been fed and condense $SO_3$ components in the combustion flue gas, an electric dust collection apparatus provided in the flue, a desulfurization apparatus based on a lime-gypsum process, and a circulation line for feeding a portion of the dust particles recovered by the electric dust collection apparatus into the flue that is provided on an upstream side of the cooler in the direction of flow of the flue gas for circulated use thereof as the treatment agent.

12 Claims, 3 Drawing Sheets

(51) Int. Cl.
    *B01D 53/75* (2006.01)
    *B01D 53/78* (2006.01)
    *B01D 53/81* (2006.01)
    *B01D 53/96* (2006.01)
    *B01D 53/34* (2006.01)

(52) U.S. Cl.
    CPC .............. *B01D 53/81* (2013.01); *B01D 53/96* (2013.01); *B01D 2251/404* (2013.01); *B01D 2253/102* (2013.01); *B01D 2253/112* (2013.01)

(56) References Cited

U.S. PATENT DOCUMENTS

| 2009/0162269 A1 | 6/2009 | Barger et al. |
| 2012/0237423 A1 | 9/2012 | Bialkin |

FOREIGN PATENT DOCUMENTS

| EP | 1142625 A1 | 10/2001 |
| JP | 6-64715 U | 9/1994 |
| JP | 7-110109 A | 4/1995 |
| JP | 10-305210 A | 11/1998 |
| JP | 2001-145818 A | 5/2001 |
| JP | 2007-245074 A | 9/2007 |
| JP | 2010-221085 A | 10/2010 |
| JP | 2011-125814 A | 6/2011 |
| WO | 2004/026443 A1 | 4/2004 |

OTHER PUBLICATIONS

Chinese Office Action dated Jan. 22, 2016, issued in counterpart Chinese Patent Application No. 201380055519.3, with English translation. (16 pages).
International Search Report dated Dec. 24, 2013 issued in corresponding application No. PCT/JP2013/082026.
Extended (Supplementary) European Search Report dated Jun. 21, 2016, issued in counterpart European Patent Application No. 13868670.4. (8 pages).

* cited by examiner

FLUE GAS TREATMENT APPARATUS AND FLUE GAS TREATMENT METHOD

BACKGROUND OF THE INVENTION

Technical Field

The present invention relates to a flue gas treatment apparatus and to a flue gas treatment method for removing sulfur contained in combustion flue gas.

Background Art

Fossil fuels such as heavy oil, coal, and the like contain sulfur, and when such a fossil fuel is combusted in a boiler or the like, the sulfur contents are oxidized in a furnace and most of it is oxidized into sulfur dioxide ($SO_2$) gas, and some of the sulfur dioxide gas is further oxidized to be converted into sulfur trioxide ($SO_3$) gas. When $SO_3$ gas is cooled in a smoke exhaust system, the cooled $SO_3$ gas turns into sulfuric acid ($SO_3$) mist. $SO_3$ mist consists of condensed sulfuric acid, and if coal is used as the fuel, $SO_3$ mist does not cause corrosion because $SO_3$ mist is "sprinkled" over a large amount of coal ash; on the other hand, if a fuel containing low ash content such as oil is used, $SO_3$ mist may often cause corrosion because the content of ash over which $SO_3$ mist is to be "sprinkled" is low. In particular, if a fuel including very high sulfur contents such as heavy oil is used, a large amount of $SO_3$ is generated, and thus, corrosion due to $SO_3$ that may occur in devices such as a dust collection apparatus and a flue that are installed in the smoke exhaust system has become a serious problem.

$SO_3$ mist consists of fine particles that are precipitated in a vapor phase and are difficult to collect even if a flue gas desulfurization apparatus is installed, and most of it may remain uncollected and pass through the gas desulfurization apparatus to be released from the stack as violet smoke. Therefore, a conventional flue gas treatment facility provided for power generation equipment in which the flue gas includes low ash content and the amount of generated $SO_3$ is large (i.e., the conversion rate of S is high) has been known, in which calcium carbonate ($CaCO_3$) is fed by injection for adsorption of $SO_3$ at a location downstream of a denitrification apparatus, and thus, $SO_3$ is separated and removed as gypsum to prevent corrosion of equipment that may occur due to $SO_3$ (Patent Literature 1).

In addition, a conventional apparatus has been known, in which the temperature of the flue gas is lowered to a temperature at which $SO_3$ in the flue gas changes into $SO_3$ fumes, the $SO_3$ fumes are adsorbed to charged solid particles such as calcium carbonate that has been electrically charged, and thereby, $SO_3$ is separated and removed (Patent Literature 2). FIG. 3 is a schematic diagram which illustrates such a conventional apparatus.

In the apparatus illustrated in the drawing, calcium carbonate is injected by calcium carbonate feeding means 22 into combustion flue gas, the combustion flue gas is cooled by temperature lowering means 3, and thereby $SO_3$ is condensed and adsorbed by calcium carbonate. In a desulfurization apparatus 5, the remaining calcium carbonate that has not reacted with $SO_3$ is used as a material for the lime-gypsum method and $SO_2$ is separated as gypsum.

CITATION LIST

Patent Literature

Patent Literature 1: JP 2001-145818 A
Patent Literature 2: JP 2007-245074 A

SUMMARY OF INVENTION

Technical Problem

However, the apparatus illustrated in FIG. 3 has a problem in that because it is necessary to feed a large amount of calcium carbonate in order to increase the probability of contact between $SO_3$ and calcium carbonate, the operation cost is high due to the increase in the consumption of calcium carbonate. Furthermore, another problem may arise in that because a large amount of calcium carbonate is used, the ratio of the calcium contents in relation to sulfur contents is excessively high, and thus, the purity of gypsum generated by the desulfurization apparatus 5 may degrade. In addition, yet another problem may arise such that because an excessively large amount of calcium carbonate is used, the level of dust concentration at the outlet of a flue gas desulfurization apparatus may be high.

The present invention has been devised in consideration of the above-described problems, and an object of the present invention is to provide a flue gas treatment apparatus and a flue gas treatment method capable of further greatly reducing operation costs compared with a conventional apparatus while maintaining efficiency of removing $SO_3$ at or above a specific level.

Solution to Problem

In order to achieve the above object, according to an aspect of the present invention, a flue gas treatment apparatus for removing sulfur contents contained in combustion flue gas comprises treatment agent feeding means for feeding a treatment agent into a flue through which the combustion flue gas flows, temperature decreasing means for cooling the combustion flue gas to which the treatment agent has been fed to condense $SO_3$ components in the combustion flue gas, an electric dust collection apparatus provided in a flue arranged on a downstream side of the temperature decreasing means in a direction of flow of flue gas, a desulfurization apparatus based on a lime-gypsum process, provided at a downstream side of the electric dust collection apparatus in a direction of flow of the flue gas, and circulation means for feeding a portion of dust particles recovered by the electric dust collection apparatus into a flue arranged on an upstream side of the temperature decreasing means in the direction of flow of the flue gas for circulated use of the portion of the dust particles as the treatment agent.

According to another aspect of the present invention, a flue gas treatment method for removing sulfur contents contained in combustion flue gas comprises feeding a treatment agent into a flue through which the combustion flue gas flows, cooling the combustion flue gas to which the treatment agent has been fed by using a temperature decreasing means, removing dust from the cooled combustion flue gas by using an electric dust collection apparatus, and treating the combustion flue gas from which the dusts have been removed by using a desulfurization apparatus based on a lime-gypsum process, and in the method, a portion of the dust particles recovered by the electric dust collection apparatus is fed into a flue arranged on an upstream side of the temperature decreasing means for circulated use of the portion of the dust particles as the treatment agent.

Advantageous Effects of Invention

The present invention can provide a flue gas treatment apparatus and a flue gas treatment method capable of greatly reducing operational costs while maintaining the efficiency of removing $SO_3$ at or above a specific level at the same time.

DESCRIPTION OF EMBODIMENTS

Figure 1:
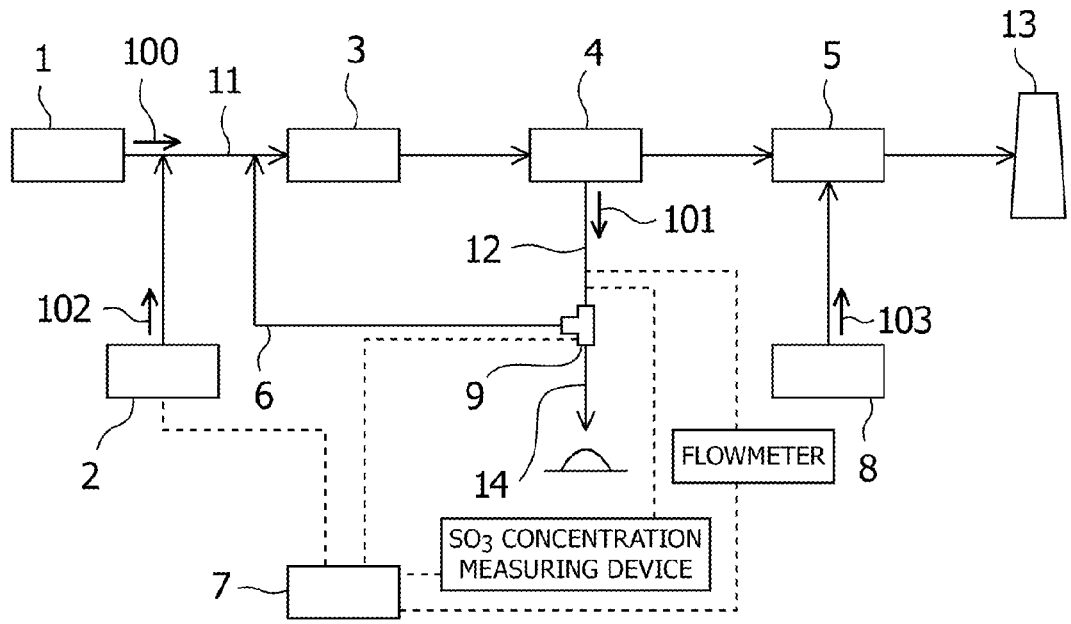
FIG. 1 is a system diagram which illustrates an embodiment of an entire configuration of a flue gas treatment apparatus of the present invention.

The present invention provides a flue gas treatment apparatus for removing sulfur contents contained in combustion flue gas, which comprises treatment agent feeding means for feeding a treatment agent into a flue through which combustion flue gas flows, temperature decreasing means for cooling the combustion flue gas to which the treatment agent has been fed to condense $SO_3$ components in the combustion flue gas, an electric dust collection apparatus provided in the flue arranged on a downstream side of the temperature decreasing means in the direction of flow of flue gas, a desulfurization apparatus based on a lime-gypsum process that is provided on a downstream side of the electric dust collection apparatus in the direction of flow of the flue gas, and circulation means for feeding a portion of dust particles recovered by the electric dust collection apparatus into a flue arranged on an upstream side of the temperature decreasing means in the direction of flow of the flue gas for circulated use of the fed dust particles as the treatment agent.

In one embodiment, the flue gas treatment apparatus of the present invention preferably further comprises control means for controlling an amount of dust particles to be disposed of, an amount of dust particles to be circulated for reuse, and an amount of treatment agent to be additionally fed so as to satisfy, at a time (t), the following expressions (I):

$$D(t)=Z(t)\times Y/(X_0+Y)\times K_1(t)$$

$$R(SO_3)(t)=Z(t)-D(t)$$

$$X(SO_3)(t)=X_0-R(SO_3)(t) \tag{I}$$

wherein $D(t)$ denotes an amount of the dust particles to be disposed of among the dust particles recovered by the electric dust collection apparatus, $Z(t)$ denotes the total amount of dust particles recovered by the electric dust collection apparatus, $X_0$ denotes an amount of the treatment agent to be fed before the circulation is started, Y denotes an amount of $SO_3$ to be removed from the combustion flue gas, $R(SO_3)(t)$ denotes an amount of the dust particles to be circulated for reuse by the circulation means, $X(SO_3)(t)$ denotes an amount of the treatment agent to be additionally fed, and $K_1(t)$ denotes a correction amount of the dust particles to be disposed of.

In one embodiment of the flue gas treatment apparatus of the present invention, it is preferable that the powder for the treatment be selected from the group consisting of calcium carbonate, activated carbon, ash, and gypsum.

In another embodiment, the flue gas treatment apparatus of the present invention preferably further comprises reusing means for feeding another portion of the dust particles recovered by the electric dust collection apparatus to the desulfurization apparatus.

In one embodiment, the flue gas treatment apparatus of the present invention further comprises control means for controlling an amount of the dust particles to be disposed of, an amount of the dust particles to be circulated for reuse, an amount of the treatment agent to be additionally fed, an amount of the dust particles to be reused in the desulfurization apparatus, and an amount of desulfurization agent to be additionally fed to the desulfurization apparatus to satisfy, at a time (t), the following expressions (II):

$$D(t)=Z(t)\times Y/(X_0+Y)\times K_2(t)$$

$$R(SO_2)(t)=F$$

$$R(SO_3)(t)=Z(t)-D(t)-R(SO_2)(t)$$

$$X(SO_2)(t)=R(SO_2)(t)\times Y/(X_0+Y)\times K_2(t)$$

$$X(SO_3)(t)=X_0-R(SO_3)(t) \tag{II}$$

wherein $D(t)$ denotes an amount of the dust particles to be disposed of after the recovery by the electric dust collection apparatus, $Z(t)$ denotes the total amount of the dust particles that have been recovered by the electric dust collection apparatus, $X_0$ denotes an amount of the treatment agent to be fed before the circulation is started, Y denotes an amount of $SO_3$ to be removed from the combustion flue gas, $R(SO_3)(t)$ denotes an amount of the dust particles to be circulated for reuse by the circulation means, $X(SO_3)(t)$ denotes an amount of the treatment agent to be additionally fed, $K(t)$ denotes a correction amount of the dust particles to be disposed of, $R(SO_2)(t)$ denotes an amount of the dust particles to be reused in the desulfurization apparatus, F denotes an amount required in the desulfurization apparatus, and $X(SO_2)(t)$ denotes an amount of desulfurization agent to be additionally fed to the desulfurization apparatus.

In one embodiment of the flue gas treatment apparatus of the present invention, the powder for the treatment is preferably calcium carbonate or activated carbon.

In another aspect, the present invention provides a flue gas treatment method for removing sulfur contents contained in combustion flue gas, comprising feeding a treatment agent into a flue through which the combustion flue gas flows, cooling the combustion flue gas to which the treatment agent has been fed by using temperature decreasing means, removing dust from the cooled combustion flue gas by using an electric dust collection apparatus, and treating the combustion flue gas after the dusts have been removed therefrom by using a desulfurization apparatus based on a lime-gypsum process, in which method some of the dust particles recovered by the electric dust collection apparatus is fed into a flue arranged on an upstream side of the temperature decreasing means for circulated use of the portion of the dust particles as the treatment agent.

In one embodiment of the flue gas treatment method of the present invention, it is preferable to control an amount of the dust particles to be disposed of, an amount of the dust particles to be circulated and used, and an amount of the treatment agent to be additionally fed so as to satisfy, at a time (t), the following expressions (I):

$$D(t)=Z(t)\times Y/(X_0+Y)\times K_1(t)$$

$$R(SO_3)(t)=Z(t)-D(t)$$

$$X(SO_3)(t)=X_0-R(SO_3)(t) \qquad (I)$$

wherein D(t) denotes an amount of the dust particles to be disposed of among the recovered dust particles, Z(t) denotes the total amount of dust particles recovered by the electric dust collection apparatus, $X_0$ denotes an amount of the treatment agent to be fed before the circulation is started, Y denotes an amount of $SO_3$ to be removed from the combustion flue gas, $R(SO_3)(t)$ denotes an amount of the dust particles to be circulated for reuse, $X(SO_3)(t)$ denotes an amount of the treatment agent to be additionally fed, and $K_1(t)$ denotes a correction amount of the dust particles to be disposed of.

In one embodiment of the flue gas treatment method of the present invention, the powder for the treatment is preferably selected from the group consisting of calcium carbonate, activated carbon, ash, and gypsum.

In another embodiment, the flue gas treatment method of the present invention preferably further comprises feeding another portion of the recovered dust particles into the desulfurization apparatus to reuse the same in the desulfurization.

In one embodiment of the flue gas treatment method of the present invention, it is preferable to control an amount of the dust particles to be disposed of, an amount of the dust particles to be circulated for reuse, an amount of the treatment agent to be additionally fed, an amount of the dust particles to be reused in the desulfurization apparatus, and an amount of the desulfurization agent to be additionally fed to the desulfurization apparatus to satisfy, at a time (t), the following expressions (II):

$$D(t)=Z(t) \times Y/(X_0+Y) \times K_2(t)$$

$$R(SO_2)(t)=F$$

$$R(SO_3)(t)=Z(t)-D(t)-R(SO_2)(t)$$

$$X(SO_2)(t)=R(SO_2)(t) \times Y/(X_0+Y) \times K_2(t)$$

$$X(SO_3)(t)=X_0-R(SO_3)(t) \qquad (II)$$

wherein D(t) denotes an amount of the dust particles to be disposed of after the dust removal step, Z(t) denotes the total amount of recovered dust particles, $X_0$ denotes an amount of the treatment agent to be fed before the circulation is started, Y denotes an amount of $SO_3$ to be removed from the combustion flue gas, $R(SO_3)(t)$ denotes an amount of the dust particles to be circulated for reuse, $X(SO_3)(t)$ denotes an amount of the treatment agent to be additionally fed, K(t) denotes a correction amount of the dust particles to be disposed of, $R(SO_2)(t)$ denotes an amount of the dust particles to be reused, F denotes an amount required in the desulfurization apparatus, and $X(SO_2)(t)$ denotes an amount of desulfurization agent to be additionally fed to the desulfurization apparatus.

In one embodiment of the flue gas treatment method of the present invention, the powder for the treatment is preferably calcium carbonate or activated carbon.

The flue gas treatment apparatus and the flue gas treatment method of the present invention will be described in more detail below. The present invention is not limited to the following embodiments.

FIG. 1 illustrates one embodiment of the flue gas treatment apparatus of the present invention. The flue gas treatment apparatus illustrated in FIG. 1 comprises treatment agent feeding means 2, temperature decreasing means 3, an electric dust collection apparatus 4, a desulfurization apparatus 5, and a circulation line 6 as its main components. The temperature decreasing means 3, the electric dust collection apparatus 4, and the desulfurization apparatus 5 are arranged in this order via a flue.

The flue gas treatment apparatus of this embodiment includes the temperature decreasing means 3 that is arranged via a flue 11 on a downstream side of a boiler 1 in the direction of flow of the flue gas. The treatment agent feeding means 2 is connected to the flue 11 which connects the boiler 1 and the temperature decreasing means 3. The electric dust collection apparatus 4 is provided in the flue 11 arranged on a downstream side of the temperature decreasing means 3 in the direction of flow of the flue gas. A dust particle transport line 12 is connected to the electric dust collection apparatus 4, and the dust particle transport line 12 is branched from distribution means 9 as the starting point, into a circulation line 6, which is connected to the flue 11 that connects the boiler 1 with the temperature decreasing means 3, and into a waste line 14, which is a line for disposing of the remaining dust particles. The desulfurization apparatus 5, which is connected via the flue 11, is arranged on a downstream side of the electric dust collection apparatus 4 in the direction of flow of the flue gas. A calcium carbonate feeding means 8 is connected to the desulfurization apparatus 5 via a pipe line. A stack 13, which is connected via the flue, is arranged on a downstream side of the desulfurization apparatus 5 in the direction of flow of the flue gas.

The boiler 1 is arranged on an upstream side of the flue gas treatment apparatus in the direction of flow of the flue gas, burns a fossil fuel such as heavy oil and coal, and exhausts the flue gas. It is suitable if the boiler 1 uses a fuel, such as heavy oil, having a high sulfur content and a low ash content and generating a large amount of $SO_3$. For example, a boiler such as a coal Integrated Gasification Combined Cycle (IGCC) boiler is suitable. In the flue 11 arranged between the boiler 1 and the flue gas treatment apparatus, apparatuses such as a denitrification apparatus, an electric dust collection apparatus, and a heat recovery apparatus may be installed.

The treatment agent feeding means 2 is means for feeding a treatment agent 102 into the flue 11 through which combustion flue gas 100 flows. The treatment agent feeding means 2 is connected to the flue 11 that connects the boiler 1 with the temperature decreasing means 3. Examples of the treatment agent feeding means 2 include a device constituted by a tank or a hopper for storing the treatment agent 102, a pipe line that connects the treatment agent tank or hopper with the flue 11, and means for conveying the treatment agent 102 from the treatment agent tank or hopper via the pipe line, and the like. Examples of the means for conveying the treatment agent 102 include a blower or an air compressor, and the like as gas-flow conveyance means. Examples of the means for conveying the treatment agent 102 by slurry conveyance include a device constituted by a stirring tank, in which particles of a treatment agent are mixed into liquid to convert the liquid into slurry, and a slurry pump, which is a pump for pressure-feeding the slurry produced in the stirring tank. It is suitable if a means for injecting the treatment agent 102 into the combustion flue gas in the flue 11, e.g., an injection grid having a plurality of injection nozzles, for example, is provided at an outlet port of the pipe line. The amount of the treatment agent to be fed from the treatment agent feeding means 2 is preferably controlled by a control device 7, which will be described below.

The treatment agent 102 is preferably solid particles selected from the group consisting of calcium carbonate, activated carbon, ash, and gypsum. The treatment agent has an action of adsorbing $SO_3$ mist contained in the combustion flue gas in the flue. In addition to the action of adsorbing $SO_3$ mist, activated carbon has an action of binding to organic matter (e.g., a component for detecting total organic carbon (TOC) such as humic acid), heavy metals (e.g., Hg), HCl, and $H_2S$, and thereby, it is enabled to remove these substances from the combustion flue gas. The treatment agent is preferably fed into the flue 11 as a powder or slurry. If the treatment agent is fed as a slurry, it is preferable to use liquid that immediately vaporizes due to heat from the combustion flue gas as the liquid constituting the slurry so as to achieve a high level of action of adsorbing $SO_3$ on the surfaces of particles of the treatment agent, and commonly used water such as industrial water, for example, can be used as the liquid described above.

The temperature decreasing means 3 is a means for cooling the combustion flue gas 100 to which the treatment agent 102 has been fed and condense the $SO_3$ components in the combustion flue gas. The temperature decreasing means 3 is provided via the flue 11 on a downstream side of the boiler 1 in the direction of flow of the flue gas. The temperature decreasing means 3 decreases the temperature of the flue gas, preferably to 90 to 150° C. The temperature decreasing means 3 is not limited to a particular device and any device capable of decreasing the temperature of the flue gas to the extent that the $SO_3$ components condense can be used, and examples of the temperature decreasing means 3 include a heat recovery device such as a gas-gas heater (GGH), a cooling spray device configured to inject a cooling medium into flue gas, and the like.

The electric dust collection apparatus 4 is a means for removing dust from the flue gas that has been cooled by the temperature decreasing means 3. In the electric dust collection apparatus 4, the treatment agent that has been brought into contact with the combustion flue gas 100 is recovered as the dust particles 101. The electric dust collection apparatus 4 is provided in the flue 11 arranged on a downstream side of the temperature decreasing means 3 in the direction of flow of the flue gas. At a discharge port of the electric dust collection apparatus 4, the dust particle transport line 12 for transporting the recovered dust particles is connected. The dust particle transport line 12 is branched from the distribution means 9 as the starting point, into the circulation line 6, which is connected to the flue 11 that connects the boiler 1 with the temperature decreasing means 3, and into the waste line 14, which is a line for disposing of the remaining dust particles. The distribution means 9 includes, for example, a combination of a hopper for receiving the dust particles 101 that have been transported thereto, two valves branched therefrom into the circulation line 6 and the waste line 14, and conveyers or blowers configured to transport the smoke and dust into the lines. A flowmeter configured to measure the flow rate of the dust particles 101 conveyed from the electric dust collection apparatus 4 and an $SO_3$ concentration measuring device configured to measure the concentration of $SO_3$ in the dust particles 101 are connected to the dust particle transport line 12 on an upstream side of the distribution means 9 in the direction of flow of the dust particles. Measurement values measured by the flowmeter and the $SO_3$ concentration measuring device are output to the control means 7.

The circulation line 6 is a line for feeding dust particles into the flue 11 as a powder or slurry. The circulation line 6 preferably includes gas-flow conveyance means configured to gas-flow convey dust particles, such as a blower or an air compressor, or a slurry-conveyance means, which includes a combination of a stirring tank in which dust particles are mixed into liquid to convert the liquid into slurry and a slurry pump for pressure-feeding the slurry produced in the stirring tank. It is preferable that a means for injecting the dust particles into the combustion flue gas, e.g., an injection grid having a plurality of injection nozzles, etc., be provided at an outlet port of the circulation line 6 at the flue 11.

The desulfurization apparatus 5 is a means for removing $SO_2$ components in the combustion flue gas on the basis of a lime-gypsum process. The desulfurization apparatus 5 is provided on a downstream side of the electric dust collection apparatus 4 in the direction of flow of the flue gas, via the electric dust collection apparatus 4 and the flue 11. A known apparatus can be used as the desulfurization apparatus 5, e.g., an apparatus including an absorption column, in which sulfur contents in combustion flue gas are absorbed by an absorbing solution containing calcium carbonate as its main component, can be used. The calcium carbonate feeding means 8 for feeding calcium carbonate 103 for preparation of the absorbing solution is connected to the desulfurization apparatus 5 via a pipe line. The calcium carbonate feeding means 8 includes a hopper for storing calcium carbonate, for example. The desulfurization apparatus 5 may be connected to an apparatus, such as a belt filter, which is configured to transport gypsum slurry generated in the absorption column of the desulfurization apparatus 5 from a discharge port for dehydration and recovery thereof.

The stack 13 is arranged via the flue 11 on a downstream side of the desulfurization apparatus 5 in the direction of flow of the flue gas and is configured to discharge the flue gas to an outside of the flue gas treatment apparatus.

The control means 7 is configured to control the amount of the dust particles to be disposed of, the amount of the dust particles to be circulated for reuse, and the amount of the treatment agent to be additionally fed, on the basis of the measurement values output from the flowmeter for the dust particles and the $SO_3$ concentration measuring device. The control means 7 controls the amount of the dust particles to be disposed of by controlling the degree of opening of the waste hopper and by adjusting the output from the blower, for example. The amount of the dust particles to be circulated and used is controlled by a combined control of the conveyor and the degree of opening of the hopper, for example. The amount of the treatment agent to be additionally fed is controlled on the basis of the degree of opening of the hopper, for example.

The control means 7 may preferably carry out control of D(t): the amount of the dust particles to be disposed of R($SO_3$)(t): the amount of the dust particles to be circulated and used; and X($SO_3$)(t): the amount of the treatment agent to be additionally fed so as to satisfy, at a time (t), the following expressions (I):

$$D(t)=Z(t)\times Y/(X_0+Y)\times K_1(t)$$

$$R(SO_3)(t)=Z(t)-D(t)$$

$$X(SO_3)(t)=X_0-R(SO_3)(t) \qquad (I)$$

wherein time (t) denotes a freely selected time after having started the circulation of the dust particles.

In the expressions (I), D(t) denotes an amount of dust particles to be disposed of among the dust particles recovered by the electric dust collection apparatus 4. Z(t) denotes the total amount of the dust particles that have been recovered by the electric dust collection apparatus 4 per unit time (unit: ton/h), and the total amount of the dust particles is calculated on the basis of measurement values that have been measured by the flowmeter for measuring the flow rate of the dust particles 101, which is arranged on an upstream side of the distribution means 9 provided in the dust particle transport line 12 in the direction of flow of the dust particles. $X_0$ denotes the amount of the treatment agent to be fed before the circulation of the dust particles is started (unit: ton/h), and this amount corresponds to the amount of the treatment agent required for removing the $SO_3$ component in the combustion flue gas until the level of the $SO_3$ component is decreased to 0 ppm when the flue gas is treated without circulating the dust particles. The value of $X_0$ can be determined as a value about 10 to 30 times the value of the mass of $SO_3$ entrained in combustion flue gas. Y denotes an amount of $SO_3$ to be removed from the combustion flue gas (unit: ton/h), and this amount can be measured by the $SO_3$ concentration measuring device which measures the concentration of $SO_3$ in the dust particles 101 and is provided on an upstream side of the distribution means 9 arranged in the dust particle transport line 12 in the direction of flow of the dust particles. $R(SO_3)(t)$ denotes the amount of the dust particles to be circulated by the circulation line 6 for reuse (unit: ton/h) and $X(SO_3)(t)$ denotes the amount of the treatment agent to be additionally fed (unit: ton/h), and these amounts can be determined on the basis of the expressions (I). It should be kept in mind that because reactions between $SO_3$ and $CaCO_3$ and adsorption of $SO_3$ by $CaCO_3$ occur, the equation $Z(t)=X_0+Y$ would not always hold.

$K_1(t)$ denotes the correction amount of the dust particles to be disposed of, and this amount is adjusted so that the purity of the treatment agent will not degrade due to repeated circulation of the dust particles. $K_1(t)$ can be a freely selected value and can be a constant or a variable. It is preferable that mass balance calculations be previously carried out to determine $K_1(t)$, and $K_1(t)$ may be preferably determined to have a value for maintaining a high effective concentration of the treatment agent component, i.e., a value for maintaining a high level of concentration of the treatment agent available for removal of $SO_3$, after the circulation of the dust particles has reached a stable state. The mass balance calculations can be carried out by performing calculations by the expressions (I) in consideration of changes with time. For example, in order to maintain the efficiency of removal of $SO_3$ components at 60% or higher, it is preferable that the effective concentration of the treatment agent component when the circulation of the dust particles has reached the stable state be 60% by mass or higher, more preferably 70% by mass or higher, in relation to the entirety of the substances recovered by the electric dust collection apparatus 4, or it is preferable that the concentration of $SO_3$ recovered by the electric dust collection apparatus 4 when the circulation of the dust particles has reached the stationary state be 40% by mass or less, and more preferably 30% by mass. Based on the mass balance calculation, $K_1(t)$ may have a value of 2.5 or more, preferably, and may more preferably have a value ranging from 3.5 to 4.0. By controlling the values of $K_1(t)$ within the above-described range, it is made possible to carry out control so that the stable state of the dust particles can be maintained, in which the concentration of $SO_3$ in the dust particles is restricted to be at a specific level or less and degradation of the rate of removal of $SO_3$ that may occur due to the circulated use of the dust particles is prevented.

Figure 4:
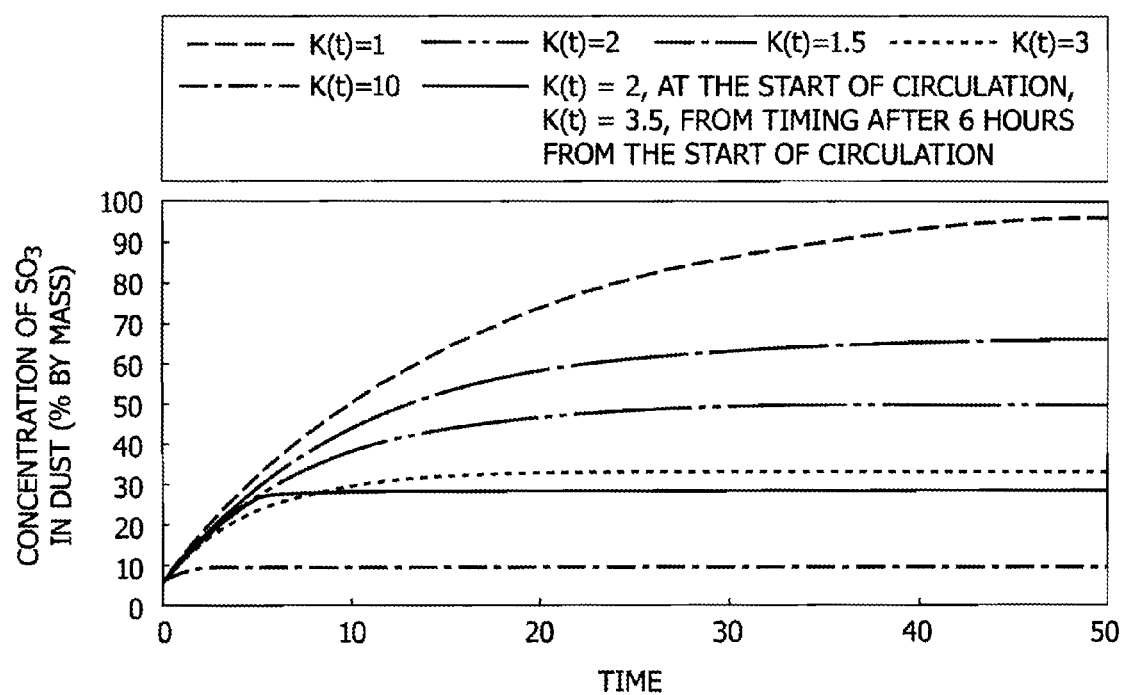
FIG. 4 is a diagram which illustrates a concentration of $SO_3$ in dust particles.

FIG. 4 is a graph illustrating calculation values of the concentration of $SO_3$ in the dust particles obtained by setting to various values the correction amount $K_1(t)$ of the dust particles to be disposed of. The concentration of $SO_3$ in the dust particles can be considered to be the same as the ratio of off-quality calcium carbonate in the dust particles. The calculation values were obtained for a case in which calcium carbonate was used as the treatment agent. For the value of $K_1(t)$, a value of 1, 1.50, 2, 3, or 10 was used, or a value of 2 was set thereto at the start of the circulation, and a value of 3.5 was set when 6 hours had elapsed since the start of the circulation. For other conditions, the calculations were performed under the following conditions: $X_0$ (the initial feeding amount)=150 ton/h and Y (the amount of $SO_3$ to be removed)=10 ton/h. It should be kept in mind that in this calculation, the change in mass occurring due to a reaction between $SO_3$ and the moisture content was not considered. It can be understood from the graph in FIG. 4 that the ratio of off-quality calcium carbonate in the dust particles can be reduced to 30% by mass or less, for example, by setting a low value to the correction amount of the dust particles to be disposed of (e.g., $K_1(t)=2$) at the start of the circulation and increasing it to a high value (e.g., $K_1(t)=3.5$) after a specific time, e.g., 6 hours, has elapsed after the start of the circulation.

Figure 5:
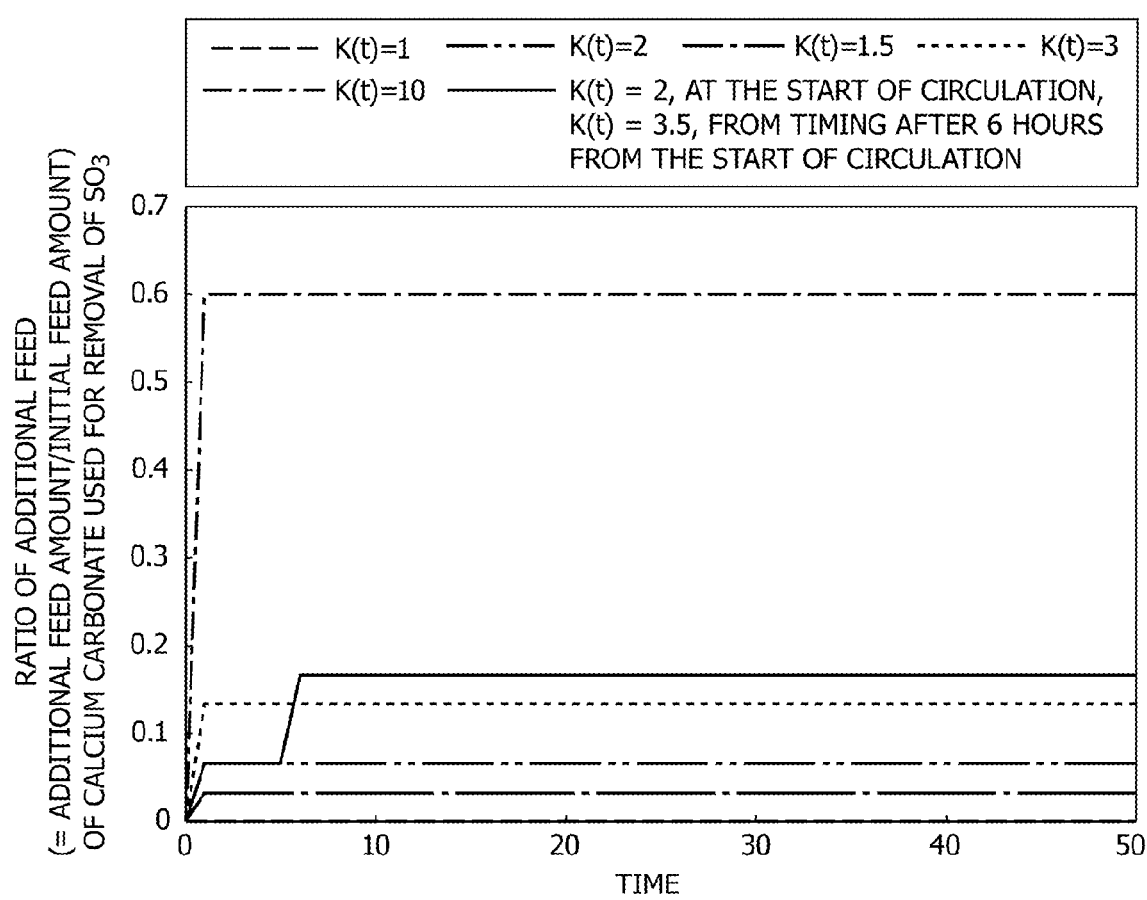
FIG. 5 is a diagram which illustrates a ratio of additional feed (=additional feed amount/initial feed amount) of calcium carbonate used for removal of $SO_3$.

FIG. 5 illustrates the ratio of calcium carbonate to be additionally fed for removal of $SO_3$, which is fed from the treatment agent feeding means 2. The graph illustrated in FIG. 5 has been generated by performing calculations under the same conditions as those used for the case illustrated in FIG. 4.

Next, an embodiment of a flue gas treatment method that uses the flue gas treatment apparatus of the present embodiment will be described. The flue gas treatment method of this embodiment includes feeding the treatment agent 102 into the flue 11 through which the combustion flue gas 100 flows, cooling the combustion flue gas 100 to which the treatment agent 102 has been fed, by using the temperature decreasing means 3, removing dust from the cooled combustion flue gas by using the electric dust collection apparatus 4, and treating the combustion flue gas after the dust has been removed therefrom by using the desulfurization apparatus 5 on the basis of the lime-gypsum process, and in the flue gas treatment method, in which a portion of the dust particles 101 recovered by the electric dust collection apparatus 4 is fed into the flue 11 provided on an upstream side of the temperature decreasing means for circulated use of the portion of the dust particles 101 as the treatment agent.

In the step of feeding the treatment agent 102 into the flue 11 through which the combustion flue gas 100 flows, the treatment agent 102 is fed by the treatment agent feeding means 2 into the flue 11, which is arranged on a downstream side of the boiler 1 and on an upstream side of the temperature decreasing means 3 in the direction of flow of the flue gas. The treatment agent 102 can be fed into the flue 11 as a powder or slurry. The amount of the treatment agent 102 to be fed is controlled by the control means 7. The treatment agent 102 is preferably injected into the combustion flue gas in the flue 11 and uniformly dispersed therein.

In the step of cooling the combustion flue gas 100, the combustion flue gas 100 is cooled by the temperature cooling means 3 to condense the $SO_3$ component in the combustion flue gas. The flue gas 100 is preferably cooled to have a temperature ranging from 90 to 150° C. When the combustion flue gas 100 is cooled, almost all the $SO_3$ components condense and change into $SO_3$ mist. The $SO_3$ mist is adsorbed by the treatment agent in the combustion flue gas and is carried by the flue gas stream to the electric dust collection apparatus 4 together with the treatment agent.

In the step of removing dust from the combustion flue gas by using the electric dust collection apparatus 4, the treatment agent to which the $SO_3$ components have been adsorbed from the combustion flue gas is separated and recovered as dust particles by using the electric dust collection apparatus 4. By carrying out this step, the $SO_3$ mist is substantially completely removed from the combustion flue gas and substantially no $SO_3$ remains in the combustion flue gas after the dust is removed. The recovered dust particles are transported to the dust particle transport line 12, a part thereof is transported into the circulation line 6 via the distribution means 9, and the other portion of the dust particles is disposed of via the waste line 14. The amount of the dust particles to be transported to the circulation line 6 and the amount of the dust particles to be disposed of are controlled by the control means 7.

In the step of carrying out treatment by using the desulfurization apparatus 5, the combustion flue gas after the dust has been removed therefrom undergoes desulfurization by the desulfurization apparatus 5 on the basis of the lime-gypsum process. To the desulfurization apparatus 5, calcium carbonate 103 is fed by the calcium carbonate feeding means 8 for preparation of an absorbing solution used in the lime-gypsum process. The amount of calcium carbonate 103 to be fed can be determined on the basis of a concentration of $SO_2$ at the inlet, a required desulfurization ratio, and a required purity of gypsum. By performing the step of carrying out the treatment by the desulfurization apparatus 5, sulfur contents in the combustion flue gas, primarily $SO_2$ components, are adsorbed into the absorbing solution to produce gypsum. Gypsum slurry precipitates in the absorbing solution, and the precipitated gypsum slurry is dehydrated by a belt filter or the like, for example, and is recovered as gypsum. If activated carbon is used as the treatment agent, Hg in the absorbing solution is adsorbed by activated carbon and is thereby removed from the combustion flue gas. Combustion flue gas that has been exhausted from the desulfurization apparatus 5 is discharged from the stack 13.

According to the flue gas treatment apparatus and the flue gas treatment method of the first embodiment, the treatment agent for the combustion flue gas can be used in a circulating manner, which thereby enables reduction of the amount of the treatment agent to be fed, and as a result, the operation costs can be reduced. Further, by controlling the ratio of the treatment agent to be circulated and used, the concentration of the effective component of the treatment agent can be maintained to a specific level or higher and degradation of the ratio of removed $SO_3$ that may occur due to circulated use of the treatment agent can be prevented. In this embodiment, the combustion flue gas undergoes dust removal by the electric dust collection apparatus 4, the treatment agent will not flow into the desulfurization apparatus 5 without being treated, and thus calcium contents in the gypsum will not become excessive. Therefore, there will be no problem that the purity of gypsum to be produced may degrade or that the concentration of smoke and dust will be high at the outlet of the desulfurization apparatus.

Figure 2:
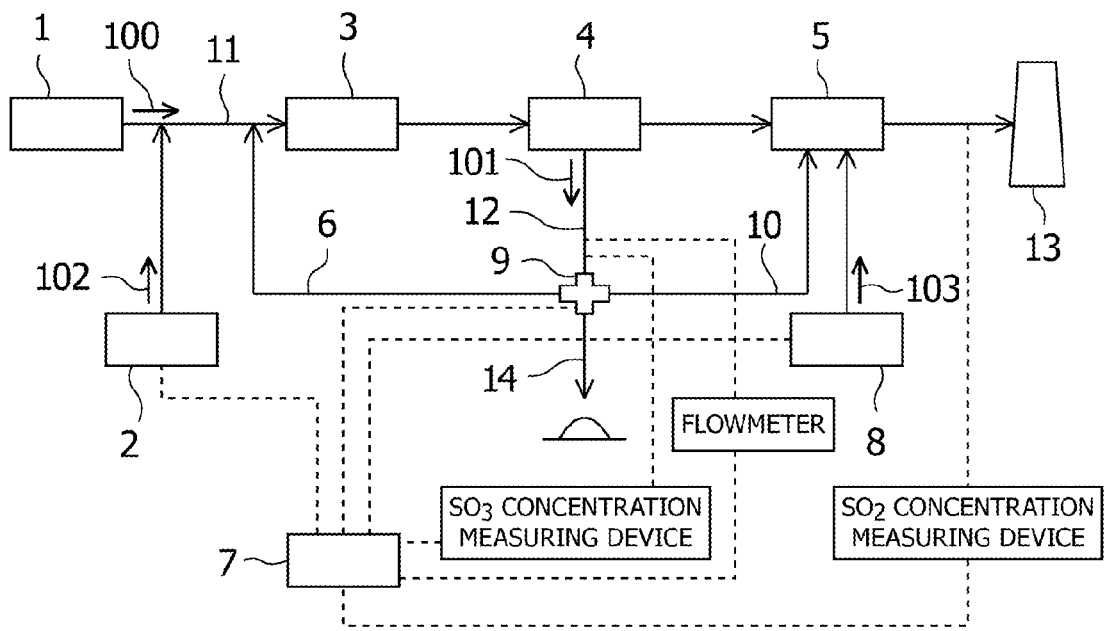
FIG. 2 is a system diagram which illustrates another embodiment of an entire configuration of a flue gas treatment apparatus according to the present invention.
Figure 3:
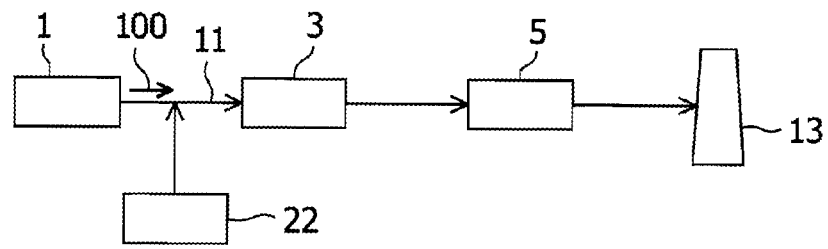
FIG. 3 is a system diagram which illustrates a flue gas treatment apparatus according to a prior art.

FIG. 2 illustrates a second embodiment of the flue gas treatment apparatus of the present invention. The flue gas treatment apparatus shown in FIG. 2 includes, as main components, the treatment agent feeding means 2, the temperature decreasing means 3, the electric dust collection apparatus 4, the desulfurization apparatus 5, the circulation line 6, and a feed line 10. The temperature decreasing means 3, the electric dust collection apparatus 4, and the desulfurization apparatus 5 are arranged in this order via the flue. The flue gas treatment apparatus of the present embodiment is characterized in that a portion of the dust particles recovered by the electric dust collection apparatus 4 is fed into the flue 11 arranged upstream of the temperature decreasing means 3 in the direction of flow of the flue gas to circulate and use a portion of the dust particles as the treatment agent, and in addition, this embodiment is characterized in that another portion of the dust particles 101 is fed to the desulfurization apparatus 5. The components provided with the same reference numerals as those in FIG. 1 have similar configurations and actions as those illustrated in FIG. 1.

The flue gas treatment apparatus of this embodiment further includes the feed line 10, which is provided at the dust particle transport line 12 and is branched from the distribution means 9 as the starting point, and is connected to the desulfurization apparatus 5. The distribution means 9 includes, for example, a combination of a hopper for receiving the dust particles 101 that have been transported thereto, three valves that branch into the circulation line 6, the waste line 14, and the feed line 10, and conveyers or blowers configured to transport smoke and dust into the lines. The feed line 10 feeds another portion of the dust particles different from the portion of the dust particles to be transported to the circulation line 6, among the dust particles 101 that have been recovered by the electric dust collection apparatus 4, to the desulfurization apparatus 5 to reuse another portion of the dust particles for preparation of an absorbing solution. The amount of dust particles to be fed to the desulfurization apparatus 5 via the feed line 10 is determined by the control means 7.

In the present embodiment, the treatment agent 102 is calcium carbonate or activated carbon. If activated carbon is used, not only $SO_3$ components, but also organic matter (components for detecting TOC such as humic acid), heavy metals (e.g., Hg), HCl, and $H_2S$ can be adsorbed and removed from the combustion flue gas.

In the flue gas treatment apparatus of the present embodiment, an $SO_2$ concentration measuring device configured to measure the concentration of $SO_2$ in the combustion flue gas that flows out of the desulfurization apparatus 5 is provided in the flue 11, which connects the desulfurization apparatus 5 with the stack 13. Measurement values measured by the $SO_2$ concentration measuring device are output to the control means 7.

The control means 7 controls the amount of the dust particles to be disposed of, the amount of the dust particles to be circulated for reuse, the amount of the treatment agent to be additionally fed, the amount of the dust particles to be reused in the desulfurization apparatus, and the amount of a desulfurization agent to be additionally fed to the desulfurization apparatus on the basis of measurement values output from the flowmeter, the $SO_3$ concentration measuring device, and the $SO_2$ concentration measuring device. The control means 7 controls the amount of dust particles to be disposed of by controlling the degree of opening of the waste hopper and by adjusting the output from the blower, for example. The amount of the dust particles to be circulated for reuse is controlled by combined control of the conveyor and the degree of opening of the hopper, for example. The amount of the treatment agent to be additionally fed is controlled on the basis of the degree of opening of the hopper, for example. The amount of the dust particles to be reused in the desulfurization apparatus is controlled by a combined control of the conveyor and the degree of opening of the hopper, for example. The amount of the desulfurization agent to be additionally fed to the desulfurization apparatus is controlled on the basis of the degree of opening of the hopper, for example.

The control means 7 may preferably carry out control of the amount of the dust particles to be disposed of, the amount of the dust particles to be circulated for reuse, and the amount of the desulfurization agent to be additionally fed so as to satisfy, at a time (t), the following expressions (II):

$$D(t)=Z(t) \times Y/(X_0+Y) \times K_2(t)$$

$$R(SO_2)(t)=F$$

$$R(SO_3)(t)=Z(t)-D(t)-R(SO_2)(t)$$

$$X(SO_2)(t)=R(SO_2)(t) \times Y/(X_0+Y) \times K_2(t)$$

$$X(SO_3)(t)=X_0-R(SO_3)(t) \quad \text{(II)}$$

In the expressions (II), $D(t)$ denotes an amount of the dust particles to be disposed of among the dust particles recovered by the electric dust collection apparatus 4. $Z(t)$ denotes the total amount of the dust particles that have been recovered by the electric dust collection apparatus 4 per unit time (unit: ton/h), and this amount is calculated on the basis of measured values measured by the flowmeter for measuring the flow rate of the dust particles 101, which is provided on an upstream side of the distribution means 9 arranged in the dust particle transport line 12 in the direction of flow of the dust particles. $X_0$ denotes the amount of the treatment agent to be fed before the circulation is started (unit: ton/h), and this amount corresponds to the amount of the treatment agent required for removing the $SO_3$ component in the combustion flue gas to the extent that the level of the $SO_3$ component is decreased to 0 ppm if the flue gas is treated without circulating the dust particles. The value of $X_0$ can be determined as a value about 10 to 30 times the value of the mass of $SO_3$ entrained in the gas. $Y$ denotes an amount of $SO_3$ to be removed from the combustion flue gas (unit: ton/h), and this amount can be measured by the $SO_3$ concentration measuring device which measures the concentration of $SO_3$ in the dust particles 101 and is provided upstream of the distribution means 9 arranged in the dust particle transport line 12 in the direction of flow of the dust particles. $F$ denotes the amount of calcium carbonate required in the desulfurization apparatus 5, and this amount can be calculated on the basis of the concentration of $SO_2$ at the inlet, a required desulfurization rate, a required purity of the gypsum, and the like. $R(SO_3)(t)$ denotes the amount of the dust particles to be circulated by the circulation line 6 for reuse (unit: ton/h), $X(SO_3)(t)$ denotes the amount of the treatment agent to be additionally fed (unit: ton/h), $R(SO_2)(t)$ denotes the amount of the dust particles to be reused in the desulfurization apparatus 5 (unit: ton/h), and $X(SO_2)(t)$ denotes the amount of calcium carbonate to be additionally fed to the desulfurization apparatus 5 (unit: ton/h), and these amounts can be determined on the basis of the expressions (II). It should be borne in mind that because reactions between $SO_3$ and $CaCO_3$ and adsorption of $SO_3$ by $CaCO_3$ occur, the equation $Z(t)=X_0+Y$ would not always hold.

$K_2(t)$ denotes the correction amount of the dust particles to be disposed of, and this amount is adjusted so that the purity of the treatment agent may not degrade due to repeated circulation of the dust particles. $K_2(t)$ may be a constant or a variable. $K_2(t)$ can have a freely selected value, and it is preferable that mass balance calculations be previously carried out to determine $K_2(t)$, and $K_2(t)$ may be preferably determined to have a value for maintaining a high effective concentration of the treatment agent component after the circulation of the dust particles has reached a stable state, i.e., it is preferable to determine $K_2(t)$ so that it may have a value for maintaining a high level of concentration of the treatment agent available for removal of $SO_3$, preferably as high as 60% by mass or more, more preferably as high as 70% by mass or more, in the dust particles recovered by the electric dust collection apparatus 4. The mass balance calculations can be carried out by time-serially performing calculations by the expressions (II).

Next, an embodiment of the flue gas treatment method that uses the flue gas treatment apparatus of this embodiment will be described. The flue gas treatment method according to this embodiment is different from the first embodiment in that it further includes a step of feeding another portion of the dust particles recovered by the electric dust collection apparatus 4 into the desulfurization apparatus 5 to be reused there.

In the step of feeding another portion of the dust particles recovered by the electric dust collection apparatus 4 into the desulfurization apparatus 5 to be reused there, another portion of the dust particles recovered by the electric dust collection apparatus 4, which is different from the portion of the dust particles recovered by the electric dust collection apparatus 4 that has been transported to the circulation line 6, is transported to the feed line 10 via the distribution means 9 and fed into the desulfurization apparatus 5 for preparation of an absorbing solution. The amount of the dust particles to be fed into the desulfurization apparatus 5 is controlled by the control means 7. The concentration of $SO_2$ in the combustion flue gas that flows out of the desulfurization apparatus 5 can be measured by using the $SO_2$ concentration measuring device which is connected to the flue 11 that connects the desulfurization apparatus 5 with the stack 13.

The flue gas treatment apparatus of this embodiment and the flue gas treatment method that uses the apparatus can achieve the effects of reducing the operation costs by reducing the amount of the treatment agent to be fed and maintain the ratio of removal of $SO_3$ to a specific level or higher at the same time, and can also achieve the effect of controlling the sulfur contents coming into the desulfurization apparatus 5 within an appropriate range, and thereby the purity of gypsum generated by the desulfurization apparatus 5 can be steadily maintained at a high level.

REFERENCE SIGNS LIST

1 Boiler
2 Treatment agent feeding means
3 Temperature decreasing means
4 Electric dust collection apparatus
5 Desulfurization apparatus
6 Circulation line
7 Control means
8 Calcium carbonate feeding means
9 Distribution means
10 Feed line
11 Flue
12 Dust particle transport line
13 Stack
14 Waste line
22 Calcium carbonate feeding means
100 Combustion flue gas
101 Dust particles
102 Treatment agent
103 Calcium carbonate

The invention claimed is:
1. A flue gas treatment apparatus for removing sulfur contents contained in combustion flue gas, comprising:

treatment agent feeding means for feeding a treatment agent into a flue through which the combustion flue gas flows;

temperature decreasing means for cooling the combustion flue gas to which the treatment agent has been fed to condense $SO_3$ components in the combustion flue gas;

an electric dust collection apparatus provided in a flue arranged on a downstream side of the temperature decreasing means in a direction of flow of flue gas;

a desulfurization apparatus based on a lime-gypsum process, provided downstream of the electric dust collection apparatus in a direction of flow of the flue gas; and circulation means for feeding a portion of dust particles recovered by the electric dust collection apparatus into a flue arranged upstream of the temperature decreasing means in the direction of flow of the flue gas for circulated use of the portion of the dust particles as the treatment agent; and control means for controlling an amount of the dust particles to be disposed of, an amount of the dust particles to be circulated for reuse, and an amount of the treatment agent to be additionally fed so as to satisfy, at a timing (t), the following expressions (I):

$$D(t)=Z(t) \times Y/(X_0+Y) \times K_1(t)$$

$$R(SO_3)(t)=Z(t)-D(t)$$

$$X(SO_3)(t)=X_0-R(SO_3)(t) \tag{I}$$

wherein D(t) denotes an amount of the dust particles to be disposed of, of the dust particles recovered by the electric dust collection apparatus, Z(t) denotes the total amount of the dust particles recovered by the electric dust collection apparatus, $X_0$ denotes an amount of the treatment agent to be fed before circulation is started, Y denotes an amount of $SO_3$ to be removed from the combustion flue gas, $R(SO_3)(t)$ denotes an amount of the dust particles to be circulated by the circulation means for reuse, $X(SO_3)(t)$ denotes an amount of the treatment agent to be additionally fed, and $K_1(t)$ denotes a correction amount of the dust particles to be disposed of.

2. The flue gas treatment apparatus according to claim 1, wherein the treatment agent is selected from the group consisting of calcium carbonate, activated carbon, ash, and gypsum.

3. The flue gas treatment apparatus according to claim 1, reusing means for feeding another portion of the dust particles recovered by the electric dust collection apparatus to the desulfurization apparatus.

4. The flue gas treatment apparatus according to claim 3, wherein the treatment agent is calcium carbonate or activated carbon.

5. A flue gas treatment apparatus for removing sulfur contents contained in combustion flue gas, comprising:

treatment agent feeding means for feeding a treatment agent into a flue through which the combustion flue gas flows;

temperature decreasing means for cooling the combustion flue gas to which the treatment agent has been fed to condense $SO_3$ components in the combustion flue gas;

an electric dust collection apparatus provided in a flue arranged on a downstream side of the temperature decreasing means in a direction of flow of flue gas;

a desulfurization apparatus based on a lime-gypsum process, provided downstream of the electric dust collection apparatus in a direction of flow of the flue gas;

circulation means for feeding a portion of dust particles recovered by the electric dust collection apparatus into a flue arranged upstream of the temperature decreasing means in the direction of flow of the flue gas for circulated use of the portion of the dust particles as the treatment agent;

reusing means for feeding another portion of the dust particles recovered by the electric dust collection apparatus to the desulfurization apparatus; and control means for controlling the amount of the dust particles to be disposed of, the amount of the dust particles to be circulated for reuse, the amount of the treatment agent to be additionally fed, the amount of the dust particles to be reused in the desulfurization apparatus, and the amount of a desulfurization agent to be additionally fed to the desulfurization apparatus so as to satisfy, at a timing (t), the following expressions (II):

$$D(t)=Z(t) \times Y/(X_0+Y) \times K_2(t)$$

$$R(SO_2)(t)=F$$

$$R(SO_3)(t)=Z(t)-D(t)-R(SO_2)(t)$$

$$X(SO_2)(t)=R(SO_2)(t) \times Y/(X_0+Y) \times K_2(t)$$

$$X(SO_3)(t)=X_0-R(SO_3)(t) \tag{II}$$

wherein D(t) denotes an amount of the dust particles to be disposed of after the dust particles have been recovered by the electric dust collection apparatus, Z(t) denotes the total amount of the dust particles that have been recovered by the electric dust collection apparatus, $X_0$ denotes an amount of the treatment agent to be fed before circulation is started, Y denotes an amount of $SO_3$ to be removed from the combustion flue gas, $R(SO_3)(t)$ denotes an amount of the dust particles to be circulated by the circulation means for reuse, $X(SO_3)(t)$ denotes an amount of the treatment agent to be additionally fed, K(t) denotes a correction amount of the dust particles to be disposed of, $R(SO_2)(t)$ denotes an amount of the dust particles to be reused in the desulfurization apparatus, F denotes an amount required in the desulfurization apparatus, and $X(SO_2)(t)$ denotes an amount of a desulfurization agent to be additionally fed to the desulfurization apparatus.

6. The flue gas treatment apparatus according to claim 5, wherein the treatment agent is calcium carbonate or activated carbon.

7. A flue gas treatment method for removing sulfur contents contained in combustion flue gas, the method comprising:

feeding a treatment agent into a flue through which the combustion flue gas flows;

cooling the combustion flue gas to which the treatment agent has been fed by using temperature decreasing means;

removing dust from the cooled combustion flue gas by using an electric dust collection apparatus; and treating the combustion flue gas from which the dust has been removed, by using a desulfurization apparatus based on a lime-gypsum process, wherein a portion of the dust particles recovered by the electric dust collection apparatus is fed into a flue arranged on an upstream side of the temperature decreasing means for circulated use of the portion of the dust particles as the treatment agent; and wherein an amount of the dust particles to be disposed of, an amount of the dust particles to be circulated for reuse, and an amount of the treatment agent to be additionally fed are controlled so as to satisfy, at a timing (t), the following expressions (I):

$$D(t)=Z(t)\times Y/(X_0+Y)\times K_1(t)$$

$$R(SO_3)(t)=Z(t)-D(t)$$

$$X(SO_3)(t)=X_0-R(SO_3)(t) \quad (I)$$

wherein $D(t)$ denotes an amount of the dust particles to be disposed of, of the recovered dust particles, $Z(t)$ denotes the total amount of the dust particles that have been recovered by the electric dust collection apparatus, $X_0$ denotes an amount of the treatment agent to be fed before circulation is started, Y denotes an amount of $SO_3$ to be removed from the combustion flue gas, $R(SO_3)(t)$ denotes an amount of the dust particles to be circulated for reuse, $X(SO_3)(t)$ denotes an amount of the treatment agent to be additionally fed, and $K_1(t)$ denotes a correction amount of the dust particles to be disposed of.

8. The flue gas treatment method according to claim 7, wherein the treatment agent is selected from the group consisting of calcium carbonate, activated carbon, ash, and gypsum.

9. The combustion flue gas treatment method according to claim 7, further comprising reusing another portion of the recovered dust particles by feeding the same into the desulfurization apparatus.

10. The combustion flue gas treatment method according to claim 9, wherein the treatment agent is calcium carbonate or activated carbon.

11. A flue gas treatment method for removing sulfur contents contained in combustion flue gas, the method comprising:
   feeding a treatment agent into a flue through which the combustion flue gas flows;
   cooling the combustion flue gas to which the treatment agent has been fed by using temperature decreasing means;
   removing dust from the cooled combustion flue gas by using an electric dust collection apparatus; and
   treating the combustion flue gas from which the dust has been removed, by using a desulfurization apparatus based on a lime-gypsum process, wherein a portion of the dust particles recovered by the electric dust collection apparatus is fed into a flue arranged on an upstream side of the temperature decreasing means for circulated use of the portion of the dust particles as the treatment agent and another portion of the recovered dust particles by the electric dust collection apparatus is reused by feeding the same into the desulfurization apparatus; and wherein an amount of the dust particles to be disposed of, an amount of the dust particles to be circulated for reuse, an amount of the treatment agent to be additionally fed, an amount of the dust particles to be reused in the desulfurization apparatus, and an amount of a desulfurization agent to be additionally fed to the desulfurization apparatus are controlled so as to satisfy, at a timing (t), the following expressions (II):

$$D(t)=Z(t)\times Y/(X_0+Y)\times K_2(t)$$

$$R(SO_2)(t)=F$$

$$R(SO_3)(t)=Z(t)-D(t)-R(SO_2)(t)$$

$$X(SO_2)(t)=R(SO_2)(t)\times Y/(X_0+Y)\times K_2(t)$$

$$X(SO_3)(t)=X_0-R(SO_3)(t) \quad (II)$$

wherein $D(t)$ denotes an amount of the dust particles to be disposed of after the dust removal step, $Z(t)$ denotes the total amount of the recovered dust particles, $X_0$ denotes an amount of the treatment agent to be fed before circulation is started, Y denotes an amount of $SO_3$ to be removed from the combustion flue gas, $R(SO_3)(t)$ denotes an amount of the dust particles to be circulated for reuse, $X(SO_3)(t)$ denotes an amount of the treatment agent to be additionally fed, $K(t)$ denotes a correction amount of the dust particles to be disposed of, $R(SO_2)(t)$ denotes an amount of the dust particles to be reused, F denotes an amount required in the desulfurization apparatus, and $X(SO_2)(t)$ denotes an amount of a desulfurization agent to be additionally fed to the desulfurization apparatus.

12. The combustion flue gas treatment method according to claim 11, wherein the treatment agent is calcium carbonate or activated carbon.

\* \* \* \* \*